United States Patent [19]

Matsubayashi et al.

[11] Patent Number: 4,659,534

[45] Date of Patent: Apr. 21, 1987

[54] PRODUCTION OF THIN-WALLED CYLINDRICAL BODY OF AROMATIC POLYESTER

[75] Inventors: Tooru Matsubayashi, Sagamihara; Seiichi Yamashiro, Kodaira, both of Japan

[73] Assignee: Teijin Limited, Higashi, Japan

[21] Appl. No.: 664,071

[22] Filed: Oct. 23, 1984

[30] Foreign Application Priority Data

Oct. 24, 1983 [JP] Japan ................................ 58-197560
Oct. 25, 1983 [JP] Japan ................................ 58-198244

[51] Int. Cl.$^4$ ............................................. B29C 55/28
[52] U.S. Cl. ..................................... 264/566; 264/557; 264/562; 264/567; 264/209.5; 264/235.6
[58] Field of Search ............... 264/563, 564, 567, 568, 264/557–662, 235.6, 565, 556, 209.3–209.5

[56] References Cited

U.S. PATENT DOCUMENTS

| | | |
|---|---|---|
| 2,688,773 | 9/1954 | McIntire ............................. 264/562 |
| 3,114,172 | 12/1963 | Coste ................................. 264/563 |
| 3,168,207 | 2/1965 | Noland et al. ...................... 264/563 |
| 3,303,243 | 2/1967 | Hughes et al. ...................... 264/563 |
| 3,313,870 | 4/1967 | Yazawa ............................... 264/559 |
| 3,466,356 | 9/1969 | Carlson, Jr. et al. ............. 264/209.5 |
| 3,500,870 | 3/1970 | Ely, Jr. et al. .................... 264/563 |
| 3,664,783 | 5/1972 | Murray .............................. 264/209.4 |
| 4,034,055 | 7/1977 | Strutzel et al. .................... 264/567 |
| 4,211,525 | 7/1980 | Vetter ................................ 264/568 |
| 4,286,429 | 9/1981 | Lin ..................................... 264/564 |
| 4,290,996 | 9/1981 | Hayashi ............................. 264/564 |

FOREIGN PATENT DOCUMENTS

| | | | |
|---|---|---|---|
| 0712067 | 6/1965 | Canada ............................... | 264/564 |
| 2536462 | 2/1977 | Fed. Rep. of Germany ...... | 264/564 |
| 3240454 | 5/1984 | Fed. Rep. of Germany ...... | 264/567 |
| 1324841 | 6/1952 | France ............................... | 264/564 |
| 0003426 | 2/1965 | Japan ................................. | 264/564 |
| 43-26108 | 11/1968 | Japan ................................. | 264/564 |
| 69-15917 | 7/1969 | Japan . | |
| 45-39476 | 12/1970 | Japan ................................. | 264/564 |
| 0048204 | 4/1982 | Japan ................................. | 264/564 |

*Primary Examiner*—Jeffery Thurlow
*Attorney, Agent, or Firm*—Wenderoth, Lind & Ponack

[57] ABSTRACT

A process for producing a thin-walled cylindrical body of an aromatic polyester, which comprises
(A) heating a continuous thick-walled tubular body of an aromatic polyester by introducing it continuously into a heating zone while feeding a pressure fluid into the thick-walled tubular body,
(B) expanding the heated thick-walled tubular body into a cylindrical form, and
(C) continuously stretching and taking up the resulting cylindrical expanded body, while at least forming a fold-free portion in the expanded body in its longitudinal direction; and a thin-walled cylindrical body of an aromatic polyester characterized by a specific intrinsic viscosity, density, wall thickness, surface roughness (CLA), and difference of its refractive indices in the circumferential direction and in a direction perpendicular to the circumferential direction, and substantial freedom from folded marks which cannot be removed at a temperature of 80° C.

17 Claims, 3 Drawing Figures

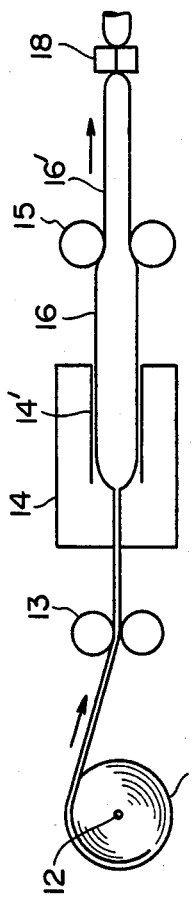
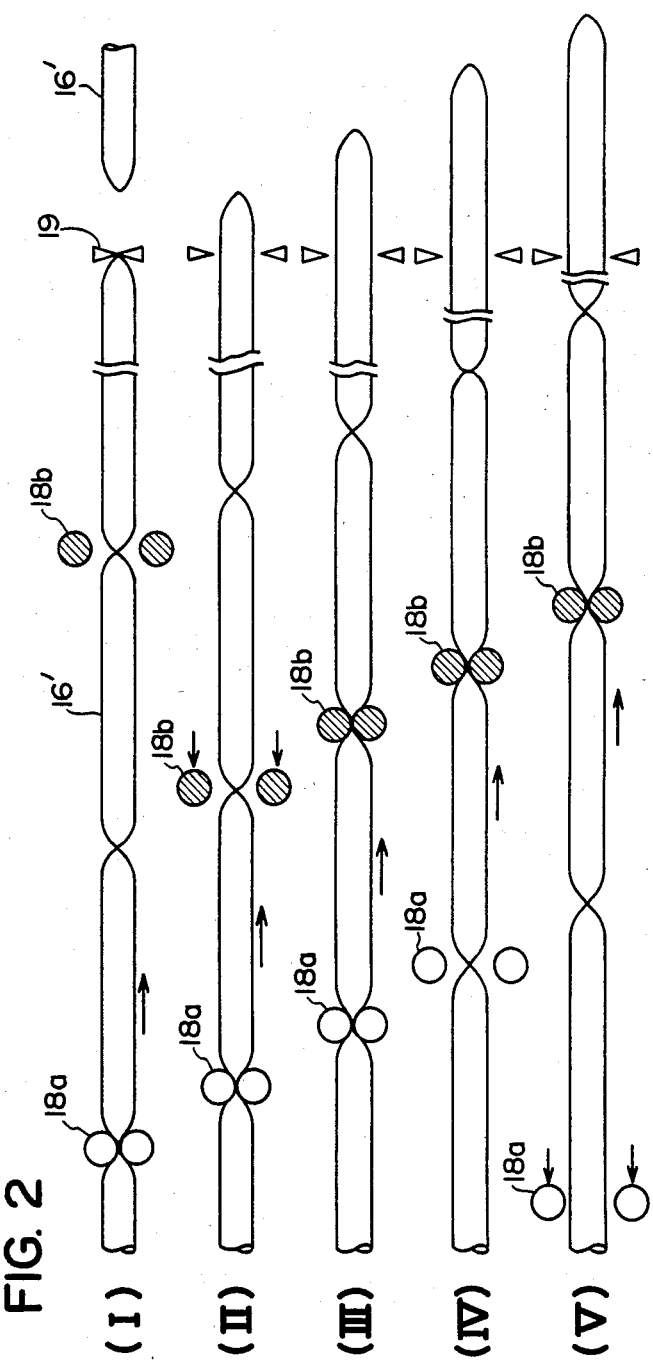
FIG. 1
FIG. 2

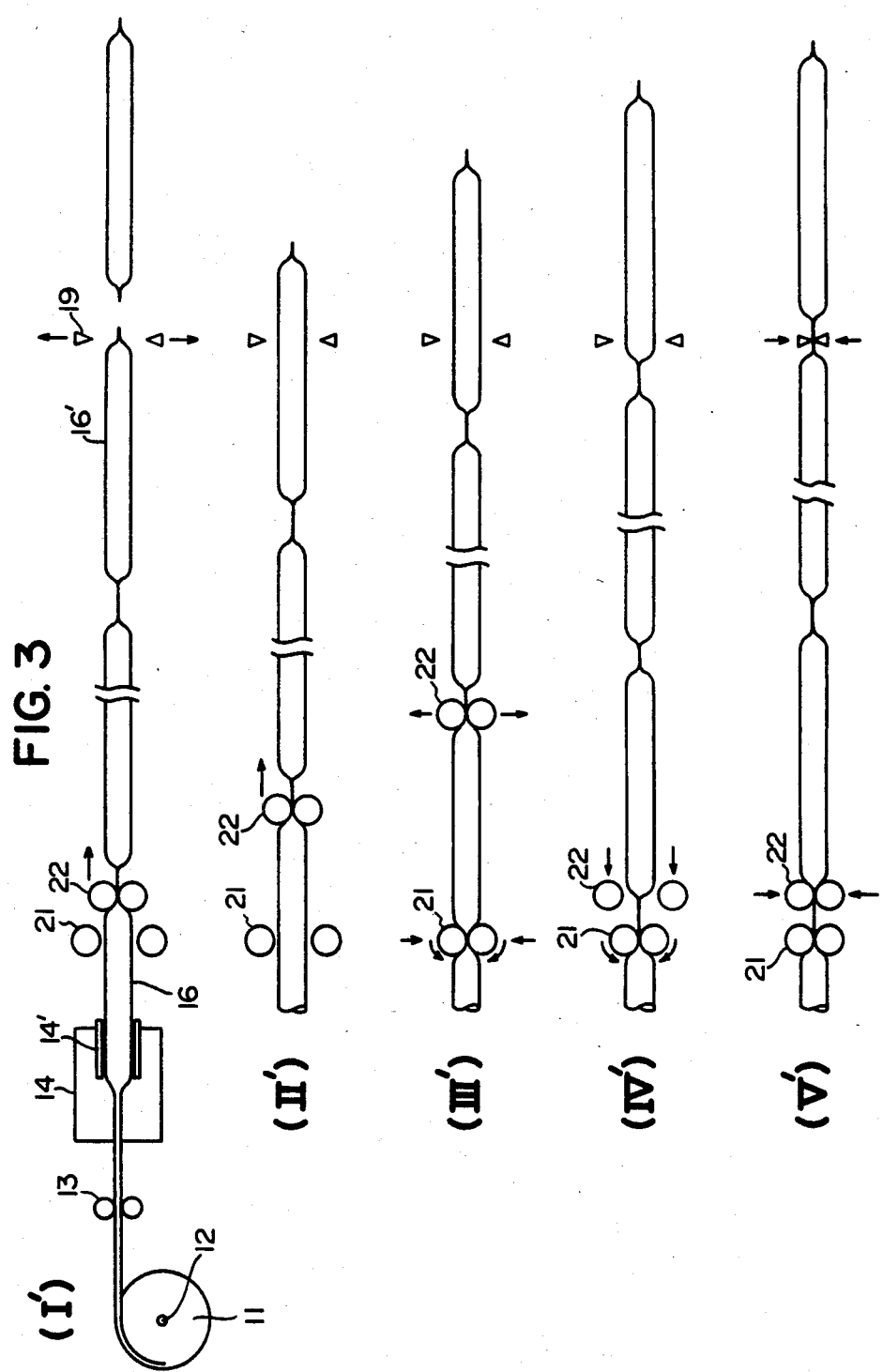

PRODUCTION OF THIN-WALLED CYLINDRICAL BODY OF AROMATIC POLYESTER

BACKGROUND OF THE INVENTION

1. Field of the Invention

This invention relates to a process for producing a thin-walled cylindrical body of an aromatic polyester, a specific thin-walled cylindrical body produced by the aforesaid process, and to the application of the aforesaid cylindrical body to a magnetic recording medium.

2. Description of the Prior Art

Production of a cylindrical thermoplastic film from a thermoplastic resin has been known as an inflation film-forming method.

Japanese Patent Publication No. 18,978/1963 discloses a process for producing a biaxially oriented thermoplastic film which comprises extruding a thermoplastic resin from an extrusion die, imparting non-tackinesss to the extruded cylindrical body, adjusting the speed of feeding the cylindrical body by a speed adjusting device having a movable surface which accurately grasps the cylindrical body without flattening it, adjusting the temperature of the cylindrical body, expanding the cylindrical body by a gas pressure, and stretching it at a speed higher than the feeding speed.

Japanese Patent Publication No. 15,928/1962 discloses a process for producing a biaxially oriented thermoplastic film, which comprises extruding a thermoplastic polymer in a tubular form, taking it up, cooling it, maintaining in the tubular sheet a pressure for expanding it, preheating it, thereafter heating the inside surface of the tubular sheet by radiated heat to expand the tubular sheet, taking up the sheet at a speed at least twice the first take-up speed, and cooling it while maintaining the expanded diameter.

Japanese Patent Publication No. 7,479/1968 discloses a process for producing a biaxially stretched tubular film, which comprises blowing a gas into an unstretched tubular film of a thermoplastic resin while maintaining it at a stretching temperature and passing it through a guide having a size which is 70 to 130% of the diameter of the unstretched film.

Japanese Patent Publication No. 15,917/1969 discloses a process for producing a jointless biaxially stretched linear polyester film, which comprises extruding a linear polyester having a low viscosity into a tube, bringing the non-oriented tube into intimate contact with a cooled inside diameter determining mandrel to cool and solidify it, heating it to a stretching temperature, taking it up at a higher speed than the extrusion speed while expanding it by a pressurized gas, and then cooling it.

Japanese Patent Publication No. 19,720/1969 discloses a heat treatment process in which an endless belt is positioned within a cylindrical film in the film advancing direction, and the film is heat-treated in a hot air atmosphere, thereby restricting the shrinking of the cylindrical film in a direction at right angles to the film advancing direction.

Japanese Patent Publication No. 32,080/1971 discloses a process for a heat-shrinkable thermoplastic synthetic resin tube, which comprises passing a thermoplastic synthetic resin tube through an expansion controlling device composed of at least three plate-like members disposed in a liquid heat medium, and expanding and stretching the tube by passing a pressure fluid into its inside.

Japanese Patent Publication No. 25,387/1976 discloses a process for producing a tubular biaxially stretched film, which comprises first stretching an unstretched tubular film of a thermoplastic resin only in the longitudinal direction, cooling the film, and then biaxially stretching it simultaneously in the longitudinal and transaverse directions.

In any of these prior processes, the final tubular film which has been expanded and stretched and as the case may be, further heat-treated is wound up in the folded flat state and offered as a product. Hence, all conventional cylindrical films obtained by the inflation film-forming method have folded marks. Cylindrical films having folded marks can be used as such in applications in which the presence of folded marks is not objectionable, but cannot be used as such in applications in which the presence of folded marks is decisively serious. For example, when a heat-shrinkable cylindrical film is used for packaging a material by utilizing its heat shrinkability, the presence of folded marks in the cylindrical film does not bear so serious a significance.

On the other hand, when a magnetic layer is provided on the inside or outside surface of the cylindrical film and the film in the cylindrical form is used as a magnetic recording medium, the cylindrical magnetic recording medium having information magnetically recorded thereon and a playback head must be rotated relative to each other with respect to the axis of the recording medium in the cylindrical direction. Hence, a cylindrical film having folded marks, however smooth a surface it may have, cannot be used as a carrier film for magnetic recording media wherein raised and depressed portions on the film surface which have an average height on the order of one hundredth of a micrometer are objectionable.

The folded marks of the cylindrical film are generally very strong. Investigations of the present inventors have shown that even when such a cylindrical film is mechanically heat-treated to remove the folded marks apparently, a magnetic recording medium produced by using it cannot permit smooth information-residual magnetism conversion by the head, and interruption of the recorded information occurs.

SUMMARY OF THE INVENTION

It is an object of this invention therefore to provide a process for producing a thin-walled cylindrical body of an aromatic polyester free from folds in the longitudinal direction of the cylinder.

Another object of this invention is to provide a process for producing a thin-walled cylindrical body of an aromatic polyester having excellent surface smoothness and a uniform wall thickness.

Still another object of this invention is to provide a process for producing a thin-walled cylindrical body of an aromatic polyester having excellent strength and dimensional stability to heat.

Yet another object of this invention is to provide a process or an apparatus for continuously and industrially advantageously producing a thin-walled cylindrical body of an aromatic polyester having various excellent properties and particularly being free from folds in the longitudinal direction.

A further object of this invention is to provide a thin-walled cylindrical body of an aromatic polyester having the aforesaid excellent properties.

A still further object of this invention is to provide a thin-walled cylindrical body of an aromatic polyester which is suitable as a magnetic layer carrier of a magnetic recording medium.

An additional object of this invention is to provide a cylindrical magnetic recording medium having on its surface a smooth magnetic layer which shows excellent electromagnetic conversion characteristics.

Other objects and advantages of this invention will become apparent from the following description.

DETAILED DESCRIPTION OF THE INVENTION

In accordance with this invention, these objects and advantages of this invention are achieved by a process for producing a thin-walled cylindrical body of an aromatic polyester, which comprises (A) heating a continuous thick-walled tubular body of an aromatic polyester having ethylene terephthalate as main recurring units by introducing it continuously into a heating zone while feeding a pressure fluid into the thick-walled tubular body, (B) expanding the heated thick-walled tubular body into a cylindrical form within the heating zone or after it has passed through the heating zone, and (C) continuously stretching and taking up the resulting cylindrical expanded body simultaneously with the expansion or after the expansion has substantially ended, while at least forming a fold-free portion in the expanded body in its longitudinal direction.

The process of this invention comprises steps (A), (B) and (C) as essential requirements.

In step (A), the continuous thick-walled tubular body of an aromatic polyester is heated by continuously introducing it into a heating zone while feeding a pressure fluid into the tubular body. The heated thick-walled tubular body is then expanded in step (B), and continuously stretched and taken up in step (C).

The thick-walled tubular body of aromatic polyester is produced by a method known per se comprising extruding a melt of the aromatic polyester from a circular slit. In the process of this invention, there is used a substantially amorphous thick-walled tubular body having a thickness of not more than about 2 mm, preferably not more than about 1 mm, and an outside diameter of not more than 30 mm, preferably not more than 20 mm, and a density of not more than 1.34 g/.cm$^3$.

The aromatic polyester used in this invention is composed of ethylene terephthlate as main recurring units. The aromatic polyester used in this invention includes not only polyethylene terephthalate, but also polyesters in which a part of terephthalic acid as an acid component and a part of ethylene glycol as a glycol component are replaced by not more than about 4% by weight, based on the total weight of the polyester, of another dicarboxylic acid component and a diol component or a hydroxycarboxylic acid component. Examples of such a dicarboxylic acid component include aromatic dicarboxylc acids such as isophthalic acid, naphthalenedicarboxylic acid, diphenyldicarboxylic acid, diphenoxyethanedicarboxylic acid, diphenylether dicarboxylic acid and diphenylsulfonedicarboxylic acid; alicyclic dicarboxylic acid such as hexahydroterephthalic acid and hexahydroisophthalic acid; and aliphatic dicarboxylic acids such as adipic acid, sebacic acid and azelaic acid. Examples of the other glycol component include trimethylene glycol, tetramethylene glycol, hexamethylene glycol, decamethylene glycol, neopentyl glycol, diethylene glycol, 1,1-cyclohexanedimethylol, 1,4-cyclohexanedimethylol, 2,2-bis(4'-beta-hydroxyethoxyphenyl)propane, and bis(4'-beta-hydroxyethoxyphenyl)sulfone. Examples of the hydroxycarboxylic acid component include p-beta-hydroxyethoxybenzoic acid and epsilon-hydroxycaproic acid.

Advantageously, these aromatic polyesters have an intrinsic viscosity of at least 0.5 dl/g, preferably at least 0.6 dl/g in view of their moldability in the formation of a thick-walled tubular body by extrusion, the prevention of longitudinal breakage of the cylindrical body and its uniform stretching in the expanding and stretching stage to be described hereinabove, and also of the properties of the final thin-walled cylindrical body.

In step (A), a pressure fluid is supplied to the hollow passage of the continuous thin-walled tubular body of the aromatic polyester from one end of the tubular body on the supply side. Usually, a gas such as compressed air is used as the pressure fluid. When the thick-walled tubular body is heated to the desired temperature, the pressure fluid imparts a force to expand the tubular body outwardly from its inside. The pressure fluid has a pressure of, for example, 0.2 to 10 kg/cm$^2$-G, preferably 0.5 to 6 kg/cm$^2$-G. Optionally, the pressure fluid may be heated. The continuous thick-walled tubular body is introduced continuously into the heating zone and heated while the pressure fluid is supplied thereto.

The continuous thick-walled tubular body is supplied continuously into the heating zone by, for example, feed rollers. The feed rollers may be comprised of a pair of rollers or two or more such pairs of rollers. The continuous thick-walled tubular body is introduced into the heating zone while being held by the rollers with a care taken not to permit formation of folds.

Heating of the continuous thick-walled tubular body in the heating zone can be effected by a cylindrical heater having an inside diameter larger than, or substantially equal to, the outside diameter of the tubular body.

The temperature within the heaing zone can be set at about 80° to about 160° C. The heating zone by the cylindrical heater can be set at the above temperature by, for example, an infrared heater or hot water. When the thick-walled tubular body introduced into the heating zone is to be heated in direct contact with hot water, the temperature of the hot water is preferably about 80° to 100° C. When it is to be heated in the heating zone through the inside wall of the heater or by an infrared heater, the heating zone is preferably set at about 100° to 160° C.

The thick-walled tubular body can be introduced, for example, at a rate of about 0.1 to 10 m/min.

The thick-walled tubular body heated in step (A) is expanded in step (B). Step (B) may be carried out within the heating zone or after the tubular body has left the heating zone.

For example, when the heating zone has a larger inside diameter than the outside diameter of the continuous thick-walled tubular body, the heated tubular body can be expanded cylindrically within the cylindrical heater along the inner wall of the latter.

When the heating zone has a substantially equal inside diameter to the outside diameter of the continuous thick-walled tubular body, the heated thick-walled tubular body cannot substantially be expanded within the heating zone, but is expanded after it has left the heating zone. In this case, a guide member forming a guide zone different from the heating zone is provided after the heating zone, and the tubular body is expanded cylindrically along the inner wall of the guide member. The expansion factor, i.e. the stretch ratio of the thick-walled tubular body in its radial direction, is generally preferably at least about 2.

The tubular body expanded in step (B) is continuously stretched and taken up in step (C) while at least forming a fold-free portion in the tubular body in its longitudinal direction. Step (C) may be practiced simultaneously with the expansion, or after the expansion has substantially ended. When step (C) is to be carried out, the cylindrical body expanded in step (B) is subjected directly to a larger stretching speed than the supplying speed of the tubular body supplied to step (B). In a consecutive procedure in which step (C) is carried out after the substantial termination of the expansion, the cylindrical body expanded in step (B) is first secured at a substantially equal speed to the supply speed of the tubular body supplied to step (B), and thereafter, the secured cylindrical body is stretched at a stretching speed higher than the above speed.

The stretch ratio in the longitudinal direction of the thick-wealled tubular body is generally preferably at least about 2.

The product of the expansion factor in step (B) multiplied by the stretch ratio in step (C), i.e. the area ratio of the tubular body, is preferably at least about 4, especially preferably at least about 8.

It is essential that the stretching and take-up of the cylindrical expanded body formed in step (C) should be carried out while at least forming a fold-free portion in it in its longitudinal direction.

Means for stretching and taking up the cylindrical expanded body while at least forming a fold-free portion in it in its longitudinal direction may be means for intermittently holding the cylindrical expanded body in the longitudinal direction to seal the pressure fluid.

There are at least two aforesaid means for intermittently holding the cylindrical expanded body in the longitudinal direction to seal the pressure fluid, and the sealing of the pressure fluid is achieved by a combination of the holding and releasing of the cylindrical expanded body by the aforesaid means.

When the combination of the stretching means and the take-up means is used in step (C), it is preferred that the take-up means hold that part of the cylindrical expanded body which has been held by the stretching means. At least two means for intermittently holding the cylindrical expanded body are required in order to achieve sealing of the pressure fluid supplied to the thick-walled tubular body while continuously producing the cylindrical expanded body. When there are two holding and sealing means, one of them can be freed from the task of holding while the other is holding the cylindrical expanded body. As a result, a cylindrical expanded body having substantially no fold in the longitudinal direction can be produced continuously.

In one embodiment, at least two means for intermittently holding the cylindrical expanded body in the longitudinal direction to seal the pressure fluid exist. One of them is a pair of rollers which are fixed between the heating zone and the take-up means and of which spaced-apart distance is adjustable, and at least one other is means movable longitudinally of the cylindrical expanded body.

In this embodiment, while the aforesaid other means holds the cylindrical expanded body to seal the pressure fluid and moves longitudinally of the cylindrical expanded body to stretch it, the pair of rollers releave the cylindrical expanded body from holding. On the other hand, from the time the other means releaves the cylindrical expanded body from holding to the time it holds the cylindrical expanded body to seal the pressure fluid, the pair of rollers rotate and stretch the cylindrical expanded body while holding the cylindrical expanded body to seal the pressure fluid.

The means for stretching the cylindrical expanded body formed in step (C) may also be a pair of stretching rolls located between the heating zone and the take-up means and spaced from each other. Advantageously, the stretching rolls in the pair are spaced from each other by such a distance that the cylindrical expanded body and each of the rolls make plane-to-plane contact, and the minimum radius of curvature in that cut section of the cylindrical expanded body which is at right angles to the longitudinal direction is preferably at least 10 times, more preferably at least 40 times, the thickness of the cylindrical expanded body. If the minimum radius of curvature is less than 10 times, particularly less than 5 times, as large as the thickness, it tends to be difficult for the expanded body to return to a smooth cylindrical form from its roll-flattened state.

The thin-walled cylindrical body produced by the aforesaid steps (A), (B) and (C) actually has a fold-free portion in the longitudinal direction, and the fold-free portion is used suitably as a magnetic layer carrier for cylindrical magnetic recording media, as will be stated hereinbelow.

The thin-walled cylindrical body obtained by the steps (A), (B) and (C) can be heat-set as required.

When it is desired to produce a heat-set thin-walled cylindrical body continuously in accordance with this invention, heat setting is carried out preferably after the stretching of the cylindrical expanded body has been substantially terminated but before it is taken up. Such heat-setting can be carried out by providing at least one pair of stretching rolls between the heating zone and the take-up means, providing a heat-setting zone between the heating zone and the stretching rolls, and heating in the heat-setting zone the cylindrical expanded body which has substantially been stretched. Alternatively, the cylindrical expanded body which has substantially been stretched in the heating zone may be heat-set by providing a heat-setting zone between the stretching rolls and the take-up means. The heat-set thin-walled cylindrical body shows an improved in surface smoothness, overall configuration or heat shrinkage resistance.

The heat-setting is carried out preferably at a temperature which is higher than the temperature of the heating zone and is within the range of about 135° to about 230° C.

BRIEF DESCRIPTION OF THE DRAWINGS

FIG. 1 is a schematic view of one example of an apparatus used for practicing the present invention;

FIG. 2 shows one embodiment of a take-up device in the apparatus for carrying out the present invention; and FIG. 3 shows the production of a thin-walled cylindrical body having a fold-free portion in the longitudinal direction by take-up devices of a different embodiment than shown in FIG. 2.

DESCRIPTION OF VARIOUS EMBODIMENTS OF THE PRESENT INVENTION

Some embodiments of the present invention will be specifically described with reference to the accompanying drawings.

FIG. 1 is a schematic view of one example of an apparatus used for practicing the present invention. In FIG. 1, the reference numeral 11 represents a thick-walled tubular body of an aromatic polyester; 12, a tube end from which a pressure fluid is supplied; 13, a pair of feed rollers; 14, a cylindrical heating device; 15, a pair of spaced stretching rollers; 16,16', a cylindrical expanded body; and 18, a take-up device. The cylindrical heating device 14 has a cylindrical portion 14' having a larger inside diameter than the outside diameter of the thick-walled tubular body, and hot water is supplied to the cylindrical portion 14' as a heat medium. The thick-walled tubular body 11 fed into the heating device 14 through the supply rollers 13 is heated there with hot water and expanded into a form conforming to the inner wall of the cylindrical portion 14'. The resulting expanded body 16 is given a sufficient force of stretching by the stretching rollers 15, but is in a slightly collapsed form, i.e. slightly flat form 16', so as not to form folds that cannot be recovered. In this state, the expanded body 16' is held by the take-up device 18 for sealing the pressure fluid and taken up in the direction of arrow.

In the embodiment shown in FIG. 1, typically the peripheral speed of the stretching rolls 15 is set at a value nearly equal to the moving speed of the take-up device, and the expanded body portion 16' is not substantially stretched.

FIG. 2 shows an explanatory view of one embodiment for specifically illustrating the take-up device in the apparatus for practicing the present invention. FIG. 2 shows the expanded body 16', take-up devices 18a and 18b and a cutter 19.

In FIG. 2, (I) to (V), arranged in the order of elapsed time, show that by the movement of the take-up devices 18a and 18b, the cylindrical expanded body 16' is continuously taken up while the pressure fluid in the cylindrical expanded body 16' is sealed. It is then cut to produce a thin-walled cylindrical body having a fold-free portion in the longitudinal direction.

In (I) of FIG. 2, the take-up device 18a holds the expanded body 16' and seals the pressure fluid, whereas the take-up device 18b has releaved the expanded body 16' from holding. When the state shown in (I) changes to the state shown in (II), the expanded body 16' moves as a whole in the same direction as the movement (to the right in the drawing) of the take-up device while it is held by the take-up device 18a. During this time, the take-up device 18b moves in a direction (to the right in the drawing) opposite to the take-up direction and reaches a position at which it next holds the expanded body 16'. In the state shown in (III), both of the take-up devices 18a and 18b hold the expanded body. When the state (III) changes to the state (IV), the take-up device 18a releaves the expanded body, but since the take-up device 18b holds it, the pressure fluid remains sealed. In the state shown in (V), the take-up device 18a has moved to the left in the drawing. From this state, the original state (I) is returned, and the procedure from the states (I) to (V) is repeated. The expanded body is properly cut by the cutter 19.

It will be appreciated that when FIG. 1 is considered together, the take-up devices 18a and 18b described above may be used alternatively as a take-up device and a stretching device if they are used in combination with the apparatus of FIG. 1 without using the stretching rolls 15.

FIG. 3 shows the production of a thin-walled cylindrical body having a fold-free portion in the longitudinal direction by take-up devices of a different embodiment from the embodiment shown in FIG. 2 with the lapse of time.

In FIG. 3, the same numbers as in FIG. 1 have the same meanings as in FIG. 1. The reference numeral 21 shows a pair of fixed rollers whose distance from each other is adjustable, and 22, a pair of rollers movable in the longitudinal direction of the cylindrical expanded body.

In the state (I'), the pair of fixed rollers are spaced from each other and thus releave the expanded body 16 from holding, whereas the other pair of movable rollers 22 hold the expanded body 16. This state then changes to the state (II'), and the expanded body 16 moves to the right in the drawing while being held by the movable rollers 22, and is stretched during this time. When the movable rollers 22 have moved a predetermined distance and still hold the expanded body 16, the fixed rollers 21 hold the expanded body. As soon as the fixed rollers 21 hold the expanded body, the movable rollers 22 releave the expanded body. Furthermore, the fixed rollers 21 begin to rotate at a nearly equal speed to the moving speed of the movable rollers 22 in a direction in which they move the expanded body to the right in the drawing (III'). In the state (IV'), the movable rollers move to the left in the drawing, and during this time, the fixed rollers 21 continue to send the expanded body to the right. During this time, a slightly folded portion is formed in the expanded body, but the length of this portion can be minimized by rapidly returning the movable rollers 22 (returning from the state III' to the state IV' or V'). In the state V', the movable rollers 22 again hold the expanded body, and when the fixed roller 21 then releave the expanded body from holding, the state (I') is resumed.

Thus, the present invention provides a thin-walled cylindrical body of an aromatic polyestrer having a fold-free portion in the longitudinal direction. The thin-walled cylindrical body free from folds or folded marks in the longitudinal direction can be obtained by removing the folded marks applied by the means of holding the cylindrical expanded body and sealing the pressure fluid used in the above manufacturing process from the aromatic polyester thin-walled cylindrical body produced by this invention.

According to this invention, there is provided a thin-walled cylindrical body having excellent properties defined by the following property values (1) to (6).

(1) It is composed of an aromatic polyester containing ethylene terephthalate units as main recurring units and having an intrinsic viscosity of at least 0.5 dl/g;

(2) it has a wall thickness of up to 100 microns;

(3) at least one of its inside surface and outside surface has a surface roughness (CLA) in the circumferential direction of up to 0.05 micron;

(4) the difference between its refractive index in the circumferential direction and that in the thickness direction and the difference between its refractive index in a direction perpendicular to the circumferential direction and that in the thickness direction are both at least 0.03;

(5) it has a density of at least 1.37 g/cm$^3$; and (6) it is substantially free from folded marks which cannot be removed at a temperature of 80° C.

The aromatic polyester having ethylene terephthalate units as main recurring units preferably includes polyethylene terephthalate homopolymer and copolymers, polyethylene terephthalate being preferred. The aromatic polyester has an intrinsic viscosity of at least 0.5 dl/g, preferably at least 0.6 dl/g, more preferably at least 0.7 dl/g.

The thickness of the thin-walled cylinder is up to 100 microns, preferably 8 to 80 microns, more preferably 10 to 60 microns.

The thin-walled cylindrical body of this invention has a thickness of up to 100 microns. In particular, when the thin-walled cylindrical body of this ivnention has the preferred range of thickness specified above, it is thinner than conventional aromatic polyester cylindrical bodies.

At least one of the inside and outside surfaces of the thin-walled cylindrical body of this invention has a surface roughness (CLA) in the circumferential direction of up to 0.05 micron, and is very smooth. Preferably, at least the inside surface has a surface roughness in the circumferential direction of up to 0.05 micron. More preferably, at least one of the inside and outside surfaces has a surface roughenss in the circumferential direction of up to 0.04 micron, especially 0.005 to 0.03 micron. Especially preferably, at least the inside surface has a surface roughess in the circumferential direction of up to 0.04 micron, particularly 0.005 to 0.03 micron.

Generally, as the wall thickness is larger, the thin-walled cylindrical body tends to be torn longitudinally parallel to the axis of the cylinder.

In the thin-walled cylindrical body of this invention, the difference between its refractive index in the circumferential direction and that in the thickness direction and the difference between its refractive index in a direction perpendicular to the circumferential direction are both at least 0.05. This limitation serves to remove the tendency of the thin-walled cylindrical body to be torn longitudinally despite having a wall thickness of up to 100 microns. Preferably, the above differences in refractive index are preferably at least about 0.1.

The thin-walled cylindrical body of this invention has very good dimensional stability to heat, and has a density of at least about 1.37 g/cm$^3$, more preferably 1.375 to 1.40 g/cm$^3$.

The final property which specifies the thin-walled cylindrical body of this invention is that it is substantially free from folded marks or folds at a temperature of 80° C. According to conventional processes for producing cylindrical bodies, the final cylindrical bodies are wound up on rolls, etc. and made the final product. Hence, the cylindrical bodies are folded completely in two, and two folded marks are formed axially of the cylindrical body. Investigations of the present inventors have shown that these folded marks are considerably firm and can never be removed at a temperature of about 80° C.

Cylindrical bodies having such folded marks cannot be used for magnetic recording media in cylindrical form because the fold marks cause troubles.

The thin-walled cylindrical body of the aromatic polyester in accordance with this invention does not have such folded marks, and can be suitably used as a magnetic layer carrier of magnetic recording media.

The cylindrical magnetic recording medium in accordance with this invention is prepared by providing a magnetic layer on at least one surface, i.e. the inside and/or outside surfaces, of the thin-walled cylindrical body of this invention. The magnetic layer may be a thin metal film or a coated film. The magnetic layer of the thin metal film-type can be obtained, for example, by forming a film of iron, cobalt, nickel, an alloy of such a metal, or an alloy of such a metal which further includes some amount of phosphorus on a substrate by vacuum evaporation, sputtering, cluster, ion vapor deposition, chemical vapor deposition, electroless plating, electroplating, etc.

Nowadays, magnetic layers of the coated film type are common, and can be formed by techniques accumulated in the art. Generally, such a magnetic layer is composed of an organic polymeric compound as a binder, a magnetic powder, a lubricant, an antistatic agent, an abrasive agent, a dispersing agent, etc. Examples of the polymeric binder include thermoplastic resins such as vinyl chloride/vinyl acetate copolymer, polyurethane resins, nitrocellulose and saturated polyester resins; epoxy resins; thermosetting resins obtained by adding curing agents such as a ploylisocyanate compounds to thermolastic resins; and polyfunctional acrylates which cure under heat, actinic light, electron beams, etc. Acicular fine particles of gamma-$Fe_2O_3$, Co-gamma-$Fe_2OI_3$, $CrO_2$, Fe and barium ferrite may be used as the magnetic powder. Examples of the lubricant are silicone oils, carbon graphite, various fatty acids and fatty acid esters. Carbon black is an example of the antistatic agent. $Al_2O_3$ and $Cr_2O_3$ are mainly used as the abrasive agent. Lecithin and surface active agents may be used as the dispersant.

The following examples illustrate the present invention in more detail. In these examples, the main properties were measured under the following conditions.

(1) Intrinsic viscosity (IV)

Measured at 35° C. using o-clorophenol as a solvent.

(2) Density

Measured at 30° C. using a density gradient tube prepared from carbon tetrachloride and n-heptane.

(3) Refractive index (n)

A polarized plate was mounted on an Abbe refractometer. The refractive indices of a sample film in the directions of thickness and plane were measured at 25° C. using sodium D line.

(4) Longitudinal tear strength

Deformation was imparted to the cut surface of a film sample parallel to its axis with various radii of curvature, and the radius of curvature at which longitudinal tearing occurred was determined.

(5) Surface roughness (center line average, CLA)

Measured by the CLA method in accordance with JIS B-0601. By using a needle-contacting surface roughness tester (SURFCOM 3B made by Tokyo Seimitsu Co., Ltd.), a chart (film surface roughness curve) was drawn under a load of 0.19 g with a needle radius of 2 microns. A portion having a measured length L was picked up from the film surface roughness curve in the direction of its center line. The center line of this portion was assumed to be X axis and the direction of the longitudinal multiplication, Y axis, and the roughness curve was expressed as $Y = f(x)$. The value given by the following equation ($R_{CLA}$ in microns) is defined as the roughnness of the film surface.

$$R_{CLA} = \frac{1}{L} \int_0^L |f(x)| dx$$

In this invention, the standard length was set at 0.25 mm, and the measurement was made through 8 replicates. The three largest measured values were excluded, and an average of the remaining five measured values was calculated and defined as $R_{CLA}$.

(6) PV (maximum projecting height)

A film roughness curve was determined in the same way as in the determination of CLA in (5). Within a standard length of 0.25 mm, the height ($P_1$) of the largest protrusion and the depth ($V_1$) of the largest depression were measured, and the sum of $P_1$ and $V_1$ was calculated and expressed in microns.

(7) Number of protrusions on the surface

Aluminum was thinly and uniformly vacuum-deposited on the film surface to a thickness of 400 to 500 Å or smaller). Several parts of the surface of the film were randomly photographed at a magnifification of 100 through a multiple interference microscope (for example, Surface Finish Microscope made by Nikon; wavelength of a thallium lamp as a light source, 5400 Å) until the total area of photographed parts became 1 mm². The number of projections having a height in the range of 0.27 to 0.54 micron, $H_1$ (number/mm²), was calculated.

EXAMPLE 1 AND COMPARATIVE EXAMPLE 1

Polyethylene terephthalate (PET) chips having an intrinsic viscosity of 0.65 were dried in a hot air dryer at 160° C. for 5 hours to adjust the water content of the chips to less than about 0.005% by weight, and then fed into an extruder (cylinder diameter 40 mm; cylinder length/cylinder diameter=22). A gear pump for stabilizing extrusion and a stainless steel sintered metallic filter (a stack of five Dynalloy×6G nets with an opening size of about 35 microns) were=secured to the forward end portion of the extruder, and a die for formation of a tube was mounted on the most forward end of the extruder. While maintaining the cylinder temperature at 280° C. and the die temperature at 260° C., the polyester chips were extruded into a tubular form and immediately solidified by cooling with water. The resulting amorphous PET tube having an outside diameter of 9 mm and a wall thickness of 0.3 mm was wound up by a take-up device having a diameter of 1 m without formation of folds in the longitudinal direction. The PET tube had an intrinsic viscosity of 0.60 and a density of 1.33 g/cm³.

The amorphous PET tube (thick-walled tubular body) wound on the take-up device through 50 turns was then stretched and expanded by using a device of the type shown in FIG. 3 (a heat setting zone was provided between the heating zone and the stretching rolls). Compressed air under 1 kg/cm².G was used as a pressure fluid and fed from one end of the amorphous PET tube. A cylindrical heating device having a cylindrical guide (pipe) for sizing placed in hot water was used. The temperature of the hot water in the heating device was adjusted to 98° C., and the stretch ratio in the longitudinal direction was set at 3 by adjusting the rotating speed of the feed rollers 13, the fixed stretching rollers 21 or the moving speed of the movable stretching rollers 22. The stretch ratio in the circumferential direction was adjusted to 4 by setting the inside diameter of the sizing pipe at 36 mm. Thus, there was obtained a thin-walled cylindrical body of polyethylene terephthalate which had an average wall thickness of 25 microns and an average outside diameter of about 36 mm and included a fold-free portion in the longitudinal direction.

Detailed conditions for stretching and expansion were as shown in Table 1 below.

Table 1

Speed of feeding the continuous thick-walled tubular body by the feed rollers: 1 m/min.

Speed of stretching by the stretching rollers: 3 m/min.

Inside diameter of the guide: 36.2 mm

Heat-setting temperature: 200° C.

Heat-setting time: 5 seconds

The expanded tubular body immediately after passage through the heat-setting zone was cooled by a water shower.

The fold-free portion in the longitudinal direction of the resulting thin-walled cylindrical body was torn axially, and the inside and outside surfaces of the resulting film-like cylindrical body were evaluated. The results are shown in Table 2 below.

A magnetic coating solution was prepared from the following ingredients.

| Ingredient | Parts by weight |
|---|---|
| Gamma-Fe₂O₃ | 70 |
| Binder for magnetic recording composed of a polyurethane elastomer and a hydroxyl-vinyl acetate copolymer | 17 |
| Carbon black | 5 |
| Dispersing agent | 2 |
| Higher fatty acid ester | 3 |
| Crosslinking agent composed of a polyisocyanate | 2 |
| Mixture of tetrahydrofuran and cyclohexanone | 180 |

The magnetic coating composition was coated to dry thickness of 4 microns on the surface of that portion of the thin-walled cylindrical body which did not have folds in the longitudinal direction, and dried at 120° C. for 3 minutes to form a magnetic layer. The resulting cylindrical body having the magnetic layer was cut open helically in a width of 12.7 mm to form a tape. As an electromagnetic conversion characteristic, the S/N (dB) ratio during 10 KBPI recording and playback was evaluated. The results were good as shown in Table 2.

For comparison, the above procedure was repeated except that the fixed stretching rolls 21 were used in such a manner as to seal the compressed air always. The resulting thin-walled cylindrical body was taken up while forming continuous folded marks in the longitudinal direction. The properties of this thin-walled cylindrical body and the electromagnetic conversion characteristic of a magnetic recording medium obtained by forming a magnetic layer on the cylindrical body are shown in Table 2. There was a great disturbance at the foled marks, and playback was impossible.

TABLE 2

| Properties | Example 1 | Comparative Example 1 |
| --- | --- | --- |
| Folded marks | None | Present |
| Folded marks after heat-setting at 80° C. for 30 minutes | None | Present |
| Density (g/cm³) | 1.391 | 1.391 |
| Degree of orientation | | |
| $n_{x-z}$ | 0.136 | 0.136 |
| $n_{y-z}$ | 0.112 | 0.112 |
| Film surface properties | | |
| CLA (microns) | 0.0069 | 0.0069* |
| PV (microns) | 0.03 | 0.03* |
| $H_1$ number of protrusions per mm² (height 0.27–0.54 micron) | 0.5 | 0.5* |
| S/N ratio (dB) 10K BPI | 49 | Playback impossible |

*Measured at portions free from folded marks.

EXAMPLES 2–5 AND COMPARATIVE EXAMPLE 2

The same amorphous PET tube (thick-walled tube) as obtained in Example 1 was stretched and expanded by a device of the type shown in FIG. 1. At this time, compressed air under 1.8 g/cm².G was used as a pressure fluid, and fed from one end of the amorphous PET tube. The same cylindrical heating device as used in Example 1 was used, and the temperature of the hot water was adjusted to 98° C. The distance between the stretching rolls 15 was adjusted as shown in Table 3, and the rotating speeds of the stretching rolls 15 and feed rolls 13 were adjusted so that stretching in the longitudinal direction was effected at a stretch ratio of 4. The stretch ratio in the circumferential direction was adjusted to 3 as in Example 1. The resulting thin-walled cylindrical body of polyethylene terephthalate had an outside diameter of 36 mm and a wall thickness of 0.5 mm. The presence or absence of folds in the longitudinal direction of the product was evaluated and the results are shown in Table 3.

TABLE 3

| | Roll distance (mm) | Minimum radius of curvature of the thin-walled cylindrical body (mm) | Radius of curvature/wall thickness (mm/mm) | Presence or absence of fold |
| --- | --- | --- | --- | --- |
| Comparative Example 2 | 0.2 | 0.1 | 2 | X |
| Example 2 | 1 | 0.5 | 10 | Δ |
| Example 3 | 2 | 1.0 | 20 | Δ |
| Example 4 | 4 | 2.0 | 40 | |
| Example 5 | 8 | 4.0 | 80 | |

Standards of evaluation of folds
X: Folded marks occurrred, and even after heat setting, did not vanish.
Δ: Folded marks were observed, but vanished after heat setting at 80° C, for 1 hour.
 : No folded mark was observed.

EXAMPLES 6–10

In each run, a thin-walled cylindrical body was obtained in the same way as in Example 1 except that the temperature of the heat-setting zone was changed as shown in Table 4. The density and dimensional stability to heat of the thin-walled cylindrical body are shown in Table 4.

TABLE 4

| | | | Heat-resistant temperature (°C.) | |
| --- | --- | --- | --- | --- |
| Example | Heat-setting temperature (°C.) | Density (g/cm³) | 0.3% (*1) | 1.0% (*2) |
| 6 | 140 | 1.375 | 80 | 95 |
| 7 | 160 | 1.380 | 90 | 110 |
| 8 | 180 | 1.385 | 96 | 120 |
| 9 | 200 | 1.390 | 100 | 130 |
| 10 | 220 | 1.396 | 105 | 142 |

(*1): The thin-walled cylindrical body was left to stand for 30 minutes in a hot air atmosphere, and the highest temperature was determined at which it had a shrinkage of less than 0.3% both in the circumferential direction and the longitudinal direction.
(*2): Under the same conditions as in (*1), the highest temperature was determined at which the cylindrical body had a shrinkage of less than 1.0% in both of the above directions.

EXAMPLES 11–15

In each run, a thin-walled cyindrical body was produced in the same way as in Example 1 except that PET chips of varying intrinsic viscosities (IV) shown in Table 5 were used. The results are shown in Table 5.

TABLE 5

| Example | IV of PET chips | IV of the thin-walled PET cylindrical body | State of the thin-walled PET cylindrical body |
| --- | --- | --- | --- |
| 11 | 1.00 | 0.82 | Returned nearly to a cylindrical form after taking up |
| 12 | 0.81 | 0.74 | Returned nearly to a cylindrical form after taking up |
| 13 | 0.74 | 0.68 | Returned nearly to a cylindrical form after taking up |
| 14 | 0.70 | 0.65 | Returned nearly to a cylindrical form after taking up |
| 15 | 0.60 | 0.54 | It was flat after taking up, but returned to a cylindrical form after heat setting. |

It is seen from Table 5 that the thin-walled cylindrical body of PET should have an intrinsic viscosity (IV) of at least 0.50.

EXAMPLES 16–18

In each run, a thin-walled cylindrical body was produced in the same way as in Example 2 except that the wall thickness of the tube and the pressure of the compressed air were changed as shown in Table 6. The results are shown in Table 6.

TABLE 6

| Example | Wall thickness of the tube (mm) | Density of the tube (g/cm³) | Pressure of compressed air (kg/cm² · G) | State of molding |
| --- | --- | --- | --- | --- |
| 16 | 1.0 | 1.334 | 3 | A cylindrical body was obtained. |
| 17 | 1.5 | 1.336 | 4.5 | A cylindrical body was obtained. |
| 18 | 2.0 | 1.338 | 6.0 | A cylindrical body was obtained. |

EXAMPLES 19-22

In each run, a cylindrical body was produced by the same method as in Example 2 except that the stretch ratios in the longitudinal direction and the circumferential direction were changed by changing the diameter of the tube and the speed of take-up as indicated in Table 7. The results are shown in Table 7.

TABLE 7

| Example | Outside diameter of the tube (mm) | Stretch ratio Circumferential direction | Stretch ratio Longitudinal direction | State of the cylindrical body |
|---|---|---|---|---|
| 19 | 12 | 3.0 | 2.0 | Good, but the wall thickness was non-uniform in the longitudinal direction |
| 20 | 18 | 2.0 | 3.0 | Good, but there was some tendency to longitudinal tearing |
| 21 | 9 | 4.0 | 2.0 | As good as in Example 2 |
| 22 | 18 | 2.0 | 4.0 | As good as in Example 2 |

EXAMPLES 23-24 AND COMPARATIVE EXAMPLE 3

In each run, a thin-walled cylindrical body was produced in the same way as in Example 1 except that each of the polyesters shown in Table 8 was used, and the heat-setting was carried out at 150° C. for 5 seconds. The density and dimension al stablity to heat of the thin-walled cylindrical body are shown in Table 8.

TABLE 8

| Run | PET copolymer IA component (*1) | PET copolymer DEG component (*2) | IV | Density (g/cm³) | Shrinkage (%) (*3) |
|---|---|---|---|---|---|
| Example 23 | 0 | 1.5 | 0.71 | 1.378 | <0.1 |
| Example 24 | 1.5 | 1.5 | 0.71 | 1.376 | 0.1-0.2 |
| Comparative Example 3 | 5.0 | 1.5 | 0.71 | 1.364 | 1-2 |

(*1): Isophthalic acid added as the dicarboxylic acid component.
(*2): Diethylene glycol formed as a by-product during polymerization.
(*3): The shrinkage of the thin-walled cylindrical body in the longitudinal direction when it was treated at 70° C. for 30 minutes.

EXAMPLE 25

A thin-walled cylindrical body was produced in the same way as in Example 1 except that a device of the type shown in FIG. 2 was used. The fold-free portion of the cylindrical body was as good as in Example 1.

What is claimed is:

1. A process for producing a thin-walled cylindrical body of an aromatic polyester, which comprises
   (A) heating a continuous thick-walled tubular body of an aromatic polyester having ethylene terephthalate as main recurring units by introducing it continuously into a heating zone while feeding a pressure fluid into the thick-walled tubular body,
   (B) expanding the heated thick-walled tubular body into a cylindrical form within the heating zone or after it has passed through the heating zone, and
   (C) continuously stretching and taking up the resulting cylindrical expanded body simultaneously with the expansion or after the expansion has substantially ended, while at least forming a fold-free portion in the expanded body in its longitudinal direction, said stretching and taking-up being carried out by using at least two means for intermittently holding the cylindrical expanded body to seal the pressure fluid and achieving the sealing of the pressure fluid by a combination of the holding and releasing of the cylindrical expanded body by said means.

2. The process of claim 1 wherein the continuous thick-walled tubular body is introduced into the heating zone by means of feed rollers.

3. The process of claim 1 wherein the heating zone for heating the continuous thick-walled tubular body is provided by a cylindrical heating member having a larger inside diameter than the outside diameter of the continuous thick-walled tubular body.

4. The process of claim 3 wherein the heated thick-walled tubular body is expanded cylindrically along the inner wall of the cylindrical heating member.

5. The process of claim 1 wherein the heated thick-walled tubular body is not substantially expanded in the heating zone, but after it has left the heating zone, it is expanded cylindrically along the inner wall of a guide member forming a guide zone different from the heating zone.

6. The process of claim 1 wherein at least two said means for intermittently holding the cylindrical expanded body in the longitudinal direction to seal the pressure fluid, one of them is a pair of rollers which are fixedly provided between the heating zone and the take-up means and whose spaced-apart distance from each other is adjustable, and the take-up means is means movable longitudinally of the cylindrical expanded body.

7. The process of claim 6 wherein while said take-up means holds the cylindrical expanded body to seal the pressure fluid and moves longitudinally of the cylindrical expanded body to stretch it, the pair of rollers releave the cylindrical body from holding, and on the other hand, from the time said other means releaves the cylindrical expanded body from holding to the time the take-up means holds the cylindrical expanded body to seal the pressure fluid, the pair of rollers hold the cylindrical body to seal the pressure fluid and rotate to stretch the cylindrical expanded body.

8. A process for producing a thin-walled cylindrical body of an aromatic polyester, which comprises
   (A) heating a continuous thick-walled tubular body of an aromatic polyester having ethylene terephthalate as main recurring units by introducing it continuously into a heating zone while feeding a pressure fluid into the thick-walled tubular body,
   (B) expanding the heated thick-walled tubular body into a cylindrical form within the heating zone or after it has passed through the heating zone, and
   (C) continuously stretching and taking up the resulting cylindrical expanded body simultaneously with the expansion or after the expansion has substantially ended, while at least forming a fold-free portion in the expanded body in its longitudinal direction, said stretching being carried out by using means for stretching the cylindrical expanded body while at least forming a fold-free portion in the longitudinal direction and said means being a pair of stretching rolls located between the heating zone and the take-up means and spaced from each other.

9. The process of claim 1 wherein the pressure fluid is a gas.

10. The process of claim 1 wherein the temperature in the heating zone is in the range of 80° to 160° C.

11. The process of claim 1 wherein the product of the expansion factor and the stretch ratio is at least about 4.

12. The process of claim 1 wherein the pressure fluid to be introduced into the continuous thick-walled tubular body has a pressure in the range of 0.2 to 10 kg/cm$^2$-G.

13. The process of claim 1 wherein after the stretching of the cylindrical expanded body has substantially ended, it is heat-set before it is, taken up.

14. The process of claim 1 wherein at least one pair of stretching rolls are provided between the heating zone and the take-up means, and the cylindrical expanded body which has been substantially stretched in the heating zone is heat-set between the heating zone and the stretching rolls.

15. The process of claim 1 wherein at least one pair of stretching rolls are provided between the heating zone and the take-up zone, and the cylindrical expanded body which has substantially been stretched in the heating zone is heat-set between the stretching rolls and the take-up means.

16. The process of any one of claims 13 to 15 wherein the heat setting is carried out at a temperature in the range of 135° to 230° C.

17. The process of claim 8 wherein the pair of stretching rolls are spaced from each other by such a distance that the cylindrical expanded body and each of the rolls make plane-to-plane contact and the minimum radius of curvature at that cut section of the cylindrical expanded body which is taken at right angles to the longitudinal direction of the expanded body is at least 10 times as large as the wall thickness of the cylindrical expanded body.

* * * * *